United States Patent [19]

Palmer et al.

[11] 4,125,037
[45] Nov. 14, 1978

[54] VARIABLE SPEED TRANSMISSION MEANS

[75] Inventors: Bertram J. Palmer, Birmingham, England; Herbert K. Steuer, Bad Homburg, Fed. Rep. of Germany

[73] Assignee: GKN Transmissions Limited, England

[21] Appl. No.: 778,890

[22] Filed: Mar. 18, 1977

Related U.S. Application Data

[63] Continuation of Ser. No. 641,681, Dec. 17, 1975, abandoned.

[51] Int. Cl.² ............ F16H 47/00; F16H 55/52
[52] U.S. Cl. ................. 74/732; 74/230.17 A
[58] Field of Search ........... 74/230.17 A, 732, 689, 74/694, 695, 700, 645

[56] References Cited

U.S. PATENT DOCUMENTS

| | | |
|---|---|---|
| 2,878,690 | 3/1959 | Capron et al. ......... 74/230.17 A X |
| 3,376,760 | 4/1968 | Gordanier ............ 74/230.17 A X |
| 3,447,397 | 6/1969 | Black et al. ................ 74/732 |
| 3,526,305 | 9/1970 | August ................ 74/732 X |
| 3,564,938 | 2/1971 | Hause ................. 74/732 X |
| 3,605,522 | 9/1971 | Grosseau ................ 74/689 |
| 3,831,463 | 8/1974 | Ahlen .................... 74/732 |

Primary Examiner—Leonard H. Gerin
Attorney, Agent, or Firm—Ostrolenk, Faber, Gerb & Soffen

[57] ABSTRACT

A transmission means for drive by a prime mover, particularly the engine of an automobile, comprising a torque converter for direct drive by the prime mover, a continuously variable speed belt drive comprising a belt or chain entrained around two variable pitch pulleys driven directly by the torque converter and a change-direction gearing driven by the belt drive and driving a rotary output, e.g. the road wheels of an automobile, the gearing having a neutral state in which the output is disconnected from the belt drive.

7 Claims, 10 Drawing Figures

VARIABLE SPEED TRANSMISSION MEANS

This is a continuation of application Ser. No. 641,681, filed Dec. 17, 1975 now abandoned.

This invention relates to variable speed transmission means. The invention has been developed in relation to such transmission means for motor vehicles.

The invention is concerned with variable speed transmission means of the kind, hereinafter referred to as the kind specified, including a hydrokinetic torque converter for drive by a prime mover, a rotary output, and the combination of a mechanical, continuously-variable speed drive and selectively-operable, change-direction gearing in series between the torque converter and the output.

By "mechanical, continuously-variable speed drive" we mean a drive which is capable of converting a constant input speed into output speeds which are steplessly variable within a given range. Examples of such drives are so called "belt drives", in which a belt or chain drives between one variable-pitch pulley and a fixed pulley or between two variable-pitch pulleys, and friction drives in which rotary motion is transmitted from one metallic part to another, often by an intermediate member, by friction generated by point or line contact. By "selectively-operable, change-direction gearing" we mean gearing which may be selectively operated to give an output rotating either in the same sense as the input to the gearing or in the opposite sense from the input.

It has heretofore been proposed to have transmission means of the kind specified in which the torque converter is arranged to be driven directly by a prime mover and in turn drives the change-direction gearing which in turn drives the output through a belt drive having two variable pulleys.

This arrangement has two disadvantages. The first disadvantage is that the transmission means is longer, in a direction parallel to the pulley shafts, than is necessary. This is because the torque converter, the change-direction gearing, and one pulley of the belt drive are arranged to rotate about the same axis.

The second disadvantage of this arrangement is that, if the transmission means is stopped in an emergency, for example, if it is in a motor vehicle and there has to be an emergency stop, the transmission means may well be stopped with the drive in a high ratio. The change-direction gearing will normally include means for disconnecting the drive from the torque converter. However, the ratio of a mechanical continuously-variable speed drive can only be changed when the drive is rotating so that the transmission means would, if stopped in a high ratio of the drive, have to start again in the same high ratio which is disadvantageous, especially when the transmission means is applied to a motor vehicle.

It is an object of the present invention to provide transmission means of the kind specified which can be made very compact and in which the second disadvantage referred to above is overcome.

According to the invention we provide a transmission means of the kind specified in which the torque converter directly drives the mechanical continuously-variable speed drive which in turn drives the output through the change-direction gearing, the latter having a neutral state in which the output is disconnected from the drive.

We have found that by placing the change-direction gearing between the drive and the output rather than between the torque converter and the drive it is possible to obtain a more compact transmission means.

Preferably the transmission means includes clutch means associated with the torque converter and selectively operable to interrupt drive through the torque converter. The clutch may be between the converter turbine and the output shaft of the converter. The clutch and the change-direction gearing are preferably controlled to be operated in synchronism so that drive through the torque converter is interrupted when the direction of drive is changed. The torque converter may also include a lock-up clutch.

Preferably the drive is a "belt drive" in which a chain drives between two variable-pitch pulleys. A transmission means including a belt drive and embodying the invention may be more compact than the previous arrangement since only the torque converter and one of the pulleys of the drive, with its adjustment means, is on one axis which constitutes one of the parallel axes of the drive, whereas on the other axis of the drive is the other pulley, with its adjustment means, and the change-direction gearing.

If the drive line, i.e. the path of the drive, is U-shaped then there are two integers in each limb of the U, i.e. the torque converter and the drive input pulley in one limb of the U and the change-direction gearing and the drive output pulley in the other limb of the U. It follows that the overall length of the U is less than if there were three integers in one limb as previously i.e. the torque converter, the change-direction gearing, and one pulley of the drive, leaving only the other pulley of the drive in the other limb of the U.

Even if the drive line is Z-shaped the above arrangement still allows the transmission means to be compact because the change-direction gearing can overlap the adjustment means of the pulley of the drive which is driven directly by the torque converter.

In an alternative arrangement using a single axis drive, e.g. a friction drive, the change-direction gearing may itself have two axes thus giving the possibility of a U-shaped or Z-shaped drive line. A suitable friction drive is that known as the Beier friction drive described by J.G. Giles in his book "Automatic and Fluid Transmissions" published by Odhams Press Limited in 1961, see page 23.

The change-direction gearing may include two selectively-operable clutches and/or brakes operable to give said neutral state, and thus a disconnection between the output and the drive, and forward and reverse rotation of the output. The gearing may, for example, be a spur-gear epicyclic gearing, the input from the drive may be to the sun gear and the output may be connected to the annulus gear. A clutch may be provided between the sun and annulus gears to give forward direct drive and a brake may be provided for the planet carrier to give reverse drive. If both the brake and the clutch are disengaged then there will be disconnection between the output and the drive.

Alternatively, the change-direction gearing may include dog-clutch means operable to give said neutral state, and thus a disconnection between the output and the drive, and forward and reverse rotation of the output. In this arrangement the gearing may further comprise a first shaft on which are rotatably mounted first and second gears which can be selectively clutched to said first shaft by said dog-clutch means and a second shaft constituting the output and having fixed thereon third and fourth gears, the first gear meshing with the third gear and the second gear meshing with an idler gear which in turn meshes with the fourth gear. The first shaft may carry an externally splined hub on which is slidable an internally splined sleeve, the sleeve having a first position in which it engages with the hub and external splines on the first gear, a second position in which it engages with the hub and external splines on the second gear and a neutral position in which it engages neither the first or second gear whereby the output is disconnected from the drive, the hub, sleeve and external splines constituting said dog-clutch means.

The invention also includes the combination of a transmission means as described above with a prime mover which drives the torque converter directly. In such a combination in which the drive is a "belt drive" the torque converter may either be located between the prime mover and one pulley of the drive or one pulley of said drive may be located between the prime mover and the torque converter. The latter arrangement is capable of giving a more compact assembly than the former as will be described below.

Transmission means embodying the invention are particularly useful in motor vehicles in which case the prime mover will be the vehicle engine which may be arranged transversely of the longitudinal axis of the motor vehicle.

Transmission means embodying the invention is also useful where the engine is arranged with its axis fore and aft but is tilted about its longitudinal axis, the U-shaped drive line enabling front-wheel-drive to be obtained in a very convenient manner.

The invention will now be described in detail, by way of example, with reference to the accompanying drawings in which.

Figure 1:
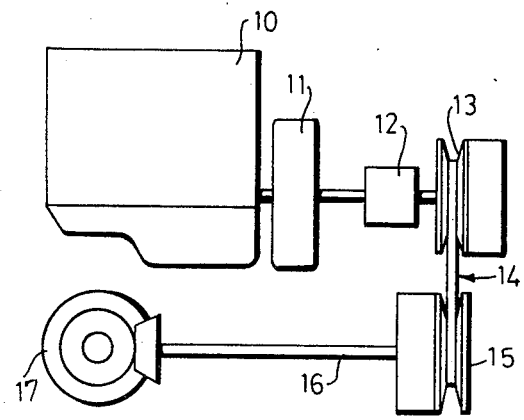
FIG. 1 is a diagram showing transmission means of the kind specified as heretofore proposed.

Referring first to FIG. 1, this shows a previously proposed arrangement in which a prime mover is indicated generally at 10 and drives a torque converter 11. The torque converter in turn drives change-direction gearing 12 which drives one pulley 13 of a mechanical, variable-speed belt drive 14. The other pulley 15 of the drive 14 is connected to an output 16 which is shown driving a crown wheel 17 of a vehicle axle.

It will be seen from FIG. 1 that the drive line, i.e. the path of the drive, from the prime mover 10 to the crown wheel 17 is generally U-shaped and that there are three integers in the upper limb of the U, i.e. the torque converter 11, the gearing 12 and the pulley 13, whereas there is only a single integer 15 in the other limb of the U. this arrangement has the disadvantages referred to above.

Figure 2:
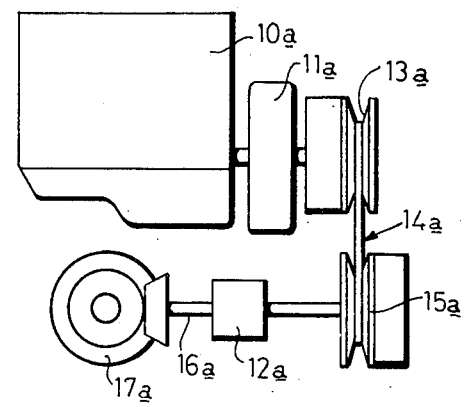
FIGS. 2 and 3 are diagrams showing transmission means of the kind specified embodying the invention.

FIG. 2 illustrates one embodiment of the invention and the corresponding parts in this FIGURE have the same reference numerals as those in FIG. 1 with the suffix a. It will be seen from FIG. 2 that the prime mover 10a drives the torque converter 11a directly which drives the one pulley 13a of the drive 14a. The gearing 12a, however, is driven from the second pulley 15a of the gearing 14a and the gearing 12a drives the output 16a and thus the crown wheel 17a. It will be seen that in this arrangement there are two integers in each limb of the U-shaped drive line, the torque converter 11a and pulley 13a in one limb and the pulley 15a and gearing 12a in the other limb. It will be seen, by comparison with FIG. 1, that the overall length of the combination of FIG. 2 is less than that of FIG. 1.

Figure 3:
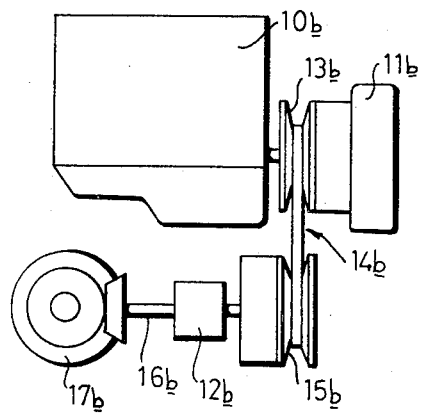

FIG. 3 illustrates a second embodiment of the invention and the corresponding parts in this FIGURE are given the same reference numerals as in FIG. 1 with the suffix b. In FIG. 3, the prime mover 10b drives the torque converter 11b directly but the pulley 13b of the drive 14b is arranged between the prime mover and the torque converter, the drive thus passing through the pulley 13b to the torque converter 11b and then from the torque converter to the pulley 13b. The pulley 15b drives the gearing 12b as before and this drives the output 16b and thus the crown wheel 17b. The combination of FIG. 3 can be more compact than that of FIG. 2.

The arrangement of FIG. 2 will now be described in more detail with reference to FIGS. 4 and 5.

Figure 4:
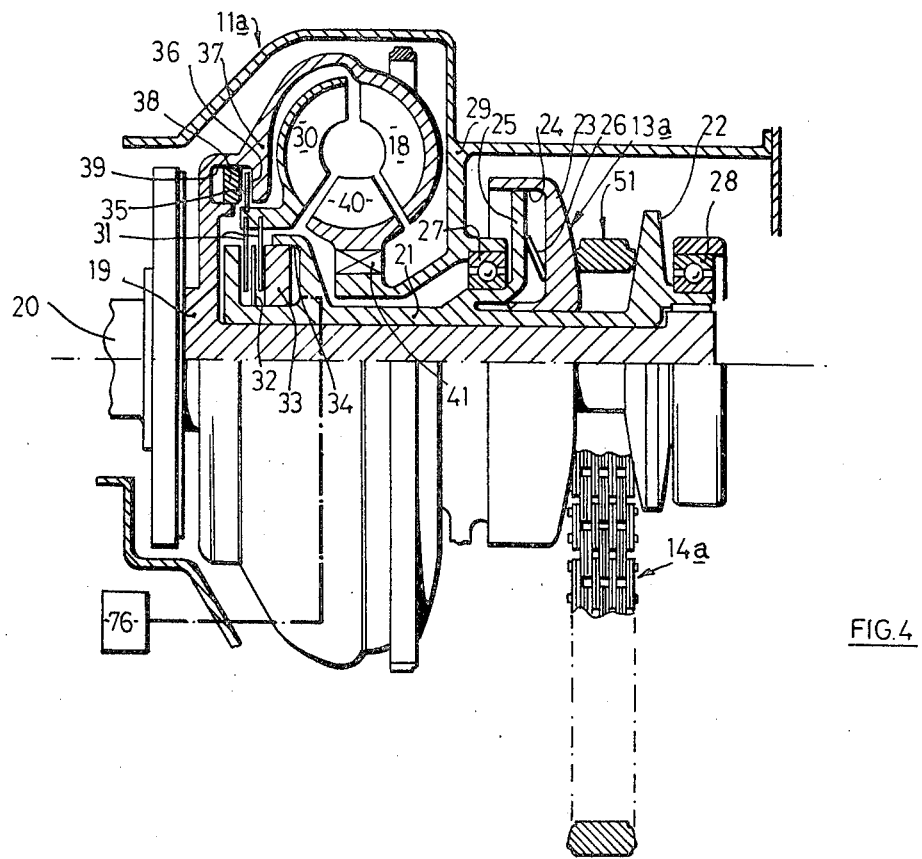
FIGS. 4 and 5 are partial sections in planes at right angles of the transmission means shown diagrammatically in FIG. 2.

Referring first to FIG. 4, the torque converter 11a comprises an impeller 18 which is secured to a shaft 19 which is driven at 20 from the crankshaft of the prime mover 10a. A shaft 21 surrounds the shaft 19 and carries, at its right hand end, the fixed part 22 of the pulley 13a. The moveable part of the pulley 13a is indicated at 23 and is slidably mounted on the shaft 21. The part 23 is provided with a cylinder 24 in which is received a piston 25 fixed to a shaft 21. A spring 26 acts between the piston 25 and the part 23 urging the latter to the right in this Figure. The shaft 21 is supported in two spaced bearings 27 and 28 in a casing indicated generally at 29.

The turbine of the torque converter is indicated generally at 30 and carries clutch plates 31 which are interleaved with a clutch plate 32 on the shaft 21. A piston 33 is received in a cylinder 34 formed in the shaft 21 and can be moved to the left in FIG. 4 to engage the plates 31 and 32 thus to clutch the turbine to the shaft 21. The turbine also carries a further clutch plate 35 which can be brought into frictional engagement with a face 36 on a part 37 which connects the impeller 18 to a shaft 19 by means of a piston 38 received in a cylinder 39 in the part 37.

The reaction member of the torque converter is indicated at 40 and is connected through a one-way clutch 41 with the casing 29.

Figure 5:
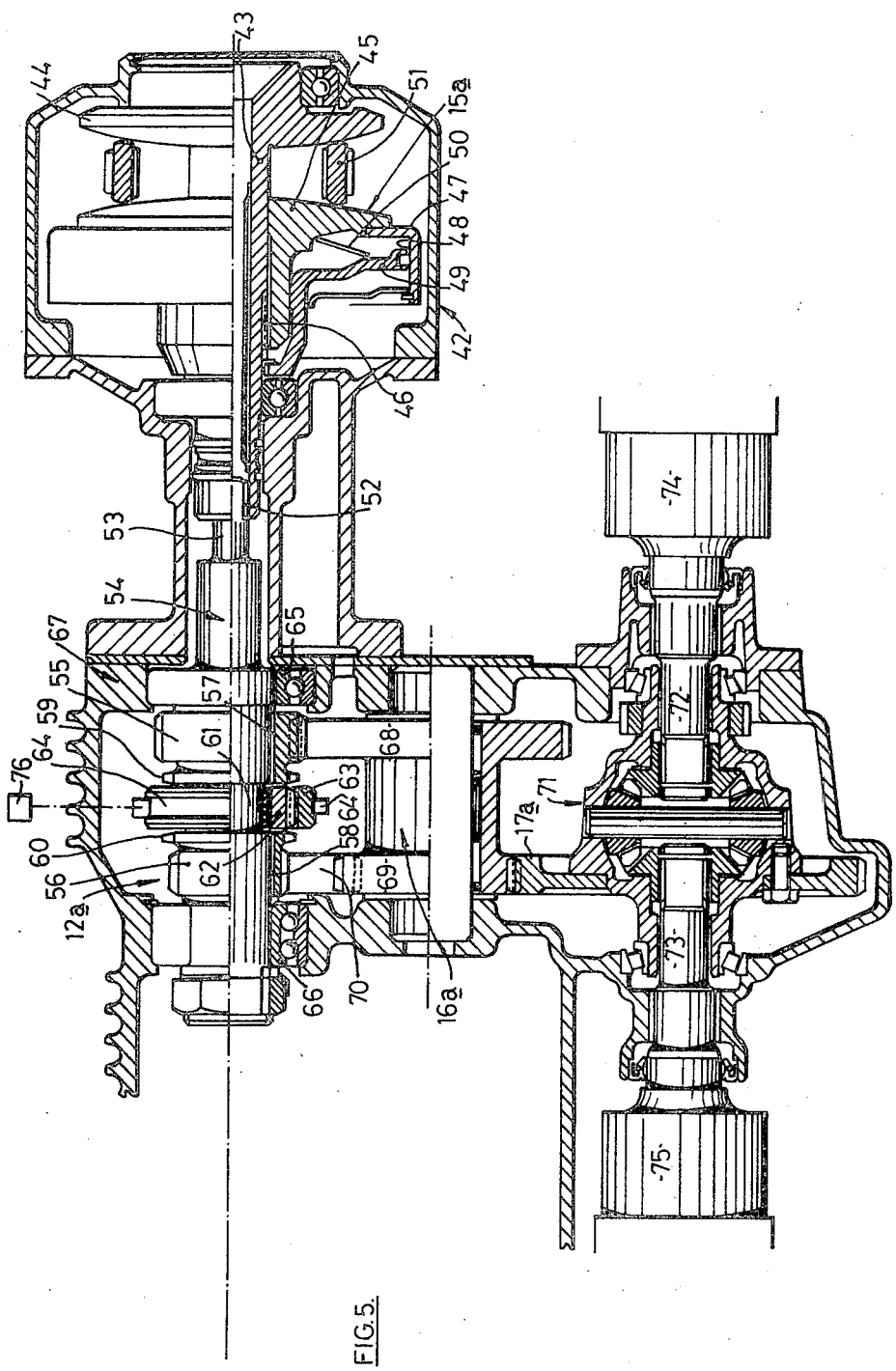

The other pulley 15a of the belt drive 14a is shown in FIG. 5 which is a section at right angles to the plane in which the section of FIG. 4 is taken. This pulley 15a is mounted in a casing indicated generally at 42 on a hollow shaft 43. The fixed part of the pulley is indicated at 44 and the movable part 45. The fixed part is formed integrally with the shaft 43, the movable part 43 is slidable on the shaft but is internally splined at 46 to engage with external splines on the shaft. The movable part 45 carries a member 47 which provides a cylinder 48 in which is mounted a piston 49 splined to the shaft 43 and located axially thereof. A spring 50 acts between the fixed piston 49 and the movable part 45 of the pulley thus urging the latter to the right in FIG. 5. A chain link belt indicated at 51 engages between the fixed and movable parts 44 and 45 of the pulley 15a and also between the fixed and movable parts 22 and 23 of the pulley 13a.

The hollow shaft 43 is internally splined at 52 and engages with the externally splined end portion 53 of a first shaft 54. The first shaft 54 carries first and second spur gears 55 and 56 respectively. These gears are mounted to be freely rotatable on the shaft 54 on bearings 57 and 58 respectively.

The gear 55 has an externally splined part 59 and a gear 56 has an externally splined part 60. The shaft 54 has an externally splined portion 61 of reduced diameter on which is mounted a hub 62 which is internally splined to engage the splines on the portion 61 and is also externally splined. Engaged with the hub 62 is an internally splined sleeve 63. This sleeve 63 is provided with an external groove 64 in which is engaged a selector fork, part of which is shown at 64. When the sleeve 63 is in the position shown it will be seen that the gears 55 and 56 are not connected to the shaft 54. The sleeve is in a neutral position and it wil be seen that this disconnects the belt drive 14a from the second or output shaft 16a which will be referred to below. If the sleeve 63 is moved to the right in FIG. 5 then it will connect the first gear 55 to the shaft 54 whereas if the sleeve 63 is moved to the left in FIG. 5 it will connect the second gear 56 to the shaft 54. The latter is held in bearings 65 and 66 in a casing indicated generally at 67.

The output shaft is indicated at 16a and is constituted by a gear cluster comprising a third gear 68 and a fourth gear 69. The third gear 68 meshes directly with the first gear 55. The fourth gear 59 meshes with an idler gear 70 which in turn meshes with the second gear 56. It will be seen that the gears 55 and 68 will rotate in opposite directions whereas the gears 56 and 69 will rotate in the same direction.

The gear 59 meshes with the ring gear 17a which is secured to a bevel type differential indicated at 71. This bevel type differential is of conventional construction and drives two half-shafts 72 and 73 which are connected, via constant velocity joints 74 and 75 respectively, with the driven wheels (not shown) of a motor vehicle.

The turbine release clutch constituted by the clutch plates 31 and 32, the piston 33 and the cylinder 34 is connected to control means indicated diagrammatically at 76 and the selector fork 64 is similarly connected to the control means 76.

The operation of the embodiment of FIGS. 4 and 5 will now be described. The prime mover 10a will drive the shaft 19 which in turn will drive the torque converter impeller 18. Assuming that the turbine release clutch is engaged and the turbine lock-up clutch, which comprises the clutch plates 35 with its operating piston 38, is released, the rotation of the turbine caused by rotation of the impeller will drive the shaft 21. The shaft will drive the pulley 13a which will, via the chain belt 51, drive the pulley 15a. The ratio of the drive constituted by the pulleys 13a, 15a and the belt 51 will be varied by varying the pitch of the pulleys 13a and 15a by relative movement between the movable parts of the pulleys and their associated pistons in a manner well known. The output from the drive will be via the shaft 43 and the first shaft 54. Drive in one direction to the half shaft 72 and 73 will be effected by moving the sleeve 63 to the right thus connecting the first gear 55 to the shaft 54. The gear 55 will drive the gear 68 which in turn, through the gear 69 will drive the ring gear 17a and thus the differential gear 71 and thus the half-shafts. Drive of half shafts in the opposite direction will be determined by the moving of the sleeve 63 to the left thus connecting the second gear 56 to the shaft 54. The gear 56 will drive the gear 69 through the idler gear 70 and the gear 69 will again drive the differential 71 and half-shafts 72 and 73. The control means 76 will be arranged so that, when it is desired to change the direction of drive, the movement of the selector fork 64 will be synchronised with the operation of the turbine release clutch thus to disconnect the torque converter from the shaft 21 and thus to disconnect the latter from the engine. This will prevent damage and ease changes in direction if an attempt should be made to change direction with the vehicle moving. It will be noted that with the sleeve 63 in the position shown in FIG. 5 the change direction gearing is in a neutral state and the drive 14a is disconnected from the output. It follows that should the vehicle be brought to an emergency stop with the drive 14a in a high ratio, the sleeve 63 can be moved to its neutral position prior to restarting the vehicle and the drive 14a then moved to its low ratio position before the sleeve 63 is moved to cause the output to rotate in one direction or the other.

It will be noted that the drive line is of U shape. That is to say the path of the drive comes from the engine to the torque converter and then to one pulley of the drive 14a, the torque converter and the one pulley being arranged in one limb of the U. The drive then passes across the base of the U via the chain belt 51 and in the other limb of the U is the other pulley of the belt drive and the change direction gearing, the change direction gearing being arranged under the torque converter or the engine. This gives a compact arrangement as described above.

Figure 6:
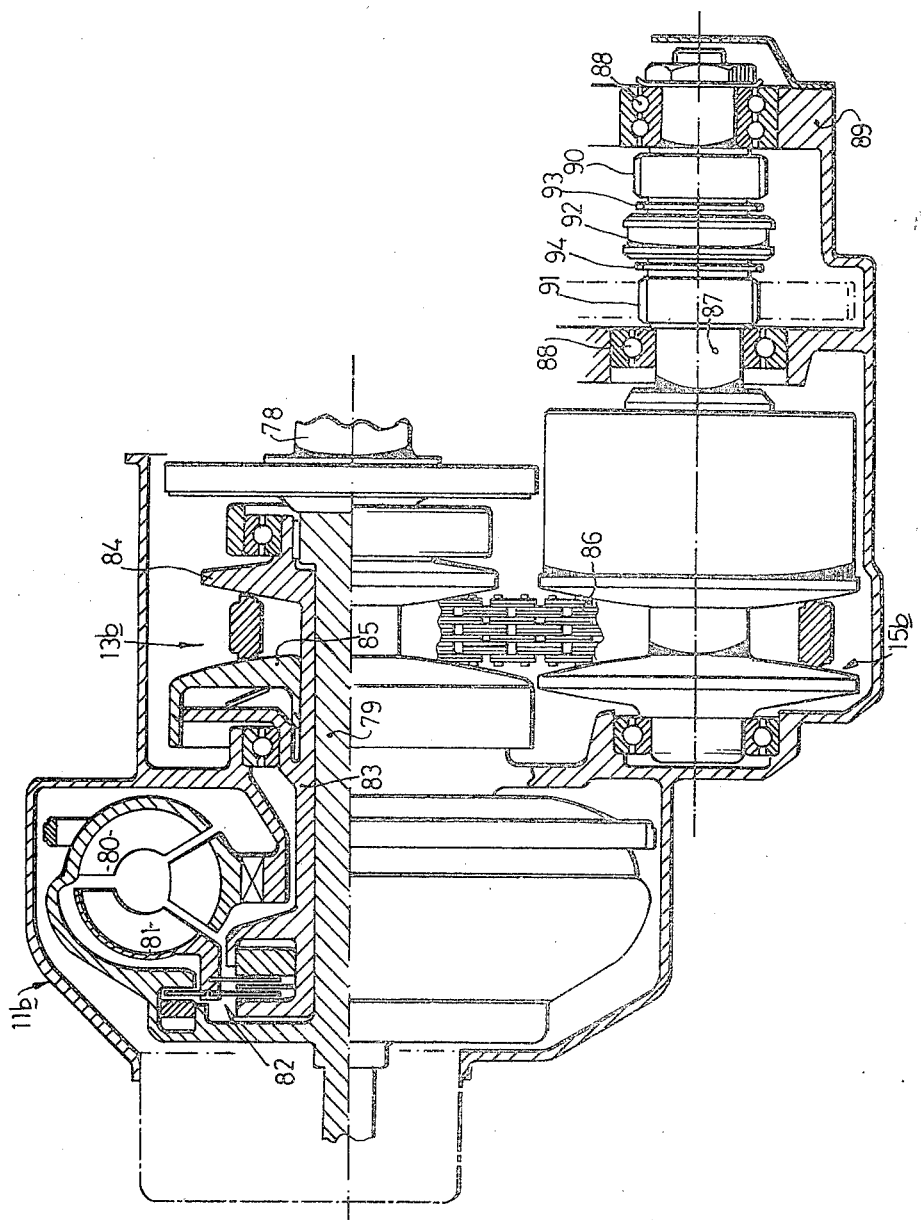
FIG. 6 is a partial section of the transmission means shown diagrammatically in FIG. 3.

FIG. 6 shows in detail the arrangement of FIG. 3. Referring to FIG. 6, the engine crank shaft is indicated at 78 and this drives a shaft 79 which passes through the pulley 13b to the torque converter 11b and is connected to the impeller 80 of the torque converter. The turbine 81 of the torque converter is connected via a turbine release clutch 82 to a hollow shaft 83 to which is connected the fixed part of the pulley 13b; the movable part of the pulley 13b is slidably mounted on the shaft 83. The detailed arrangement is similar to that of FIG. 4 and will not be described in more detail.

The second pulley of the drive is indicated at 15b and a belt chain 86 drives between the pulleys 13b and 15b. The pulley 15b drives a shaft 87 which is mounted in bearings 88 in a casing 89. The shaft carries first and second gears 90 and 91 similar to the first and second gears of the embodiment of FIG. 4 and either of these may be connected to the shaft 87 by means of dog clutch arrangement comprising an internally splined sleeve 92 engageable with splined portions 93 and 94 on the gears 90 and 91 respectively. The gears 90 and 91 will mesh with third and fourth gears which in turn will drive the differential and half shafts all as described in relation to FIG. 5. The arrangement of FIG. 6 can be made more compact than the arrangement of FIGS. 4 and 5 by placing the pulley 13b of the drive between the engine and the torque converter rather than by placing the torque converter between the engine and the pulley 13 as shown in FIG. 4. The operation of the embodiment of FIG. 6 is precisely as described in relation to FIGS. 4 and 5. In each of the embodiments, when the coupling point of the torque converter has been reached, the torque converter can be locked out by engaging the torque converter lock up clutch.

Figure 7:
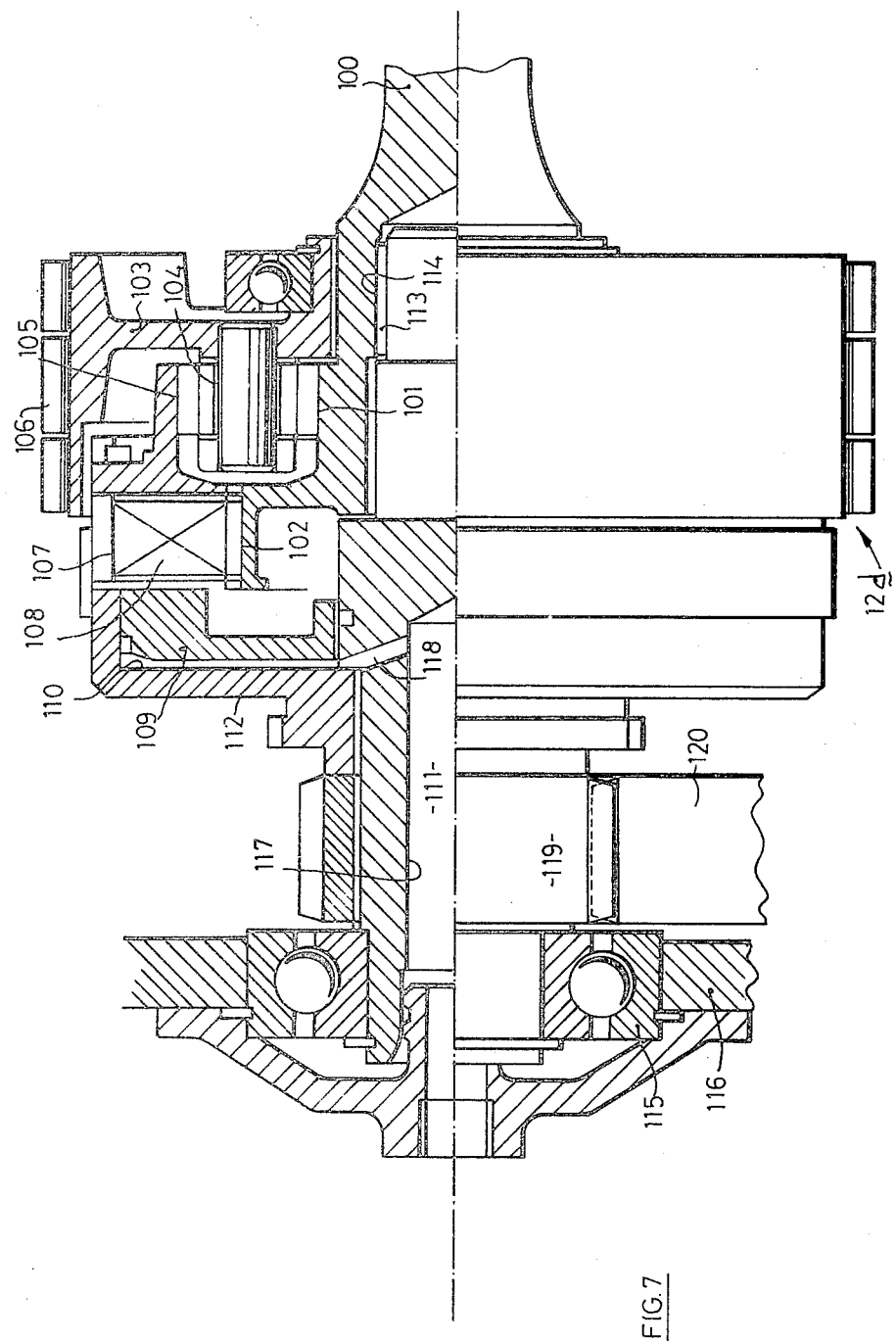
FIG. 7 is a section through an alternative form of change-direction gearing which may be used in transmission means embodying the invention.

The embodiments thus far described use a dog clutch arrangement with spur gearing to provide the change direction gearing with its neutral position. It is, however, within the invention to use an epicyclic gearing for the change direction gearing. Such an epicyclic gearing is shown in FIG. 7. The gearing is indicated at 12d and the input shaft to the gearing is indicated at 100. The shaft corresponds to the shaft 54 in FIG. 5 and would be driven from the drive 14 of the transmission means.

The shaft 100 is formed integrally with the sun gear 101 of the gearing and is extended to provide an externally splined cylindrical portion 102. The planet carrier of the gearing is indicated at 103 and carries a number of planet gears 104 which mesh with the sun gear 101 and with an annulus gear 105. The planet carrier 103 is associated with a band brake 106 which may be operated to hold the planet carrier stationary relative to the gear housing. The annulus gear 105 is connected to a cylindrical extension 107 which is internally splined. A pack of interleaved clutch discs indicated generally at 108 are splined in two sets to the extensions 102 and 107 and constitute a clutch between the annulus gear 105 and the sun gear 101. The clutch is hydraulically operated by means of a piston 109 received in a cylinder 110 to which may be supplied hydraulic fluid as will be described below.

The output of the gearing comprises a shaft 111 which is connected by means of a flange 112 to the annulus gear extension 107 and thus to the annulus gear 105. The shaft 111 is received in a bearing 113 in a counterbore 114 in the left-hand end of the shaft 100. The left-hand end of the shaft 111 is received in a bearing 115 received in a housing part 116. The shaft 111 is provided with a bore 117 to which hydraulic fluid may be supplied and there is a drilling 118 between the bore 117 and the cylinder 110 whereby hydraulic fluid can be supplied to the cylinder 110 to move the piston 109 to operate the clutch 108.

When both the brake 106 and the clutch 108 are released, the shaft 111 will be disconnected from the shaft 100 and the change direction gearing will be in its neutral state. If the brake 106 is engaged then the shaft 111 will be rotated in the opposite sense to rotation of the shaft 100, the clutch 108 also being released. If the clutch 108 is engaged and the brake 106 is released then the annulus gear 105 will be connected to the sun gear 101 and there will be a direct drive of the shaft 111 in the same rotational sense as the shaft 100. The operation of the brake 106 and the clutch 108 will be synchronised with the operation of a turbine release clutch in the torque converter as described in relation to FIGS. 4 and 5 so that the prime mover will be disconnected from the belt drive and the gearing during operation of the latter to change the direction of rotation of the output.

The shaft 111 is shown as carrying a spur gear 119 which in turn may drive a ring gear 120 connected to a differential gearing of a driven axle of a motor vehicle as described in relation to FIG. 5.

Figure 8:
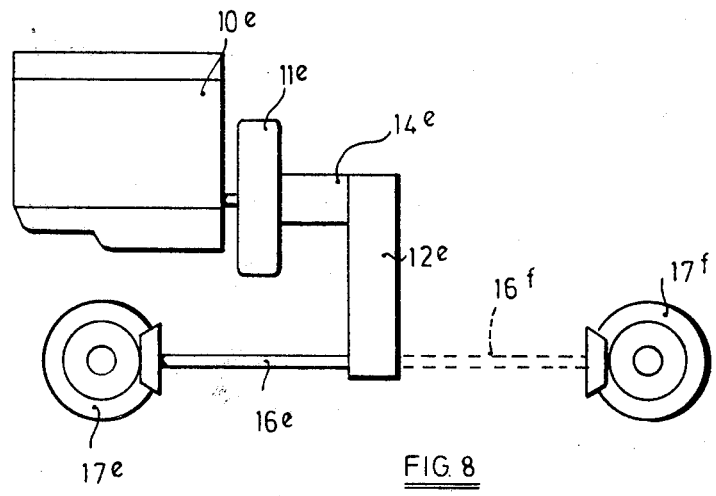
FIG. 8 is a diagram illustrating a further embodiment of the invention.

FIG. 8 shows another embodiment of the invention in which a friction drive, of the Beier type referred to above, is used in which the output is coaxial with the input. The same reference numerals are used for the same parts in FIG. 8 as appear in FIG. 1 but with the suffix e. In this arrangement however, the prime mover or engine 10e is arranged so that it is tilted about a horizontal axis. It drives the torque converter 11e which in turn drives the frction drive 14e. The output of the drive 14e is coaxial with the input and goes to the change-direction gearing 12e. This is arranged so that the output 16e rotates about an axis spaced from the axis about which the input of the gearing 12e rotates. The gearing will have a neutral state as described above. The output 16e will drive a crown wheel or ring gear 17e. It will be seen that with this arrangement it is possible to bring the output 16e back under the engine 10e so that a compact arrangement is provided but which still gives a low bonnet or hood line. Instead of the output coming forwards as at 16e it may come backwards as indicated at 16f and drive a crown wheel or ring gear 17f. This will enable a low bonnet or hood line of a motor vehicle to be obtained while still giving a low floor which is of course desirable.

Figure 9:
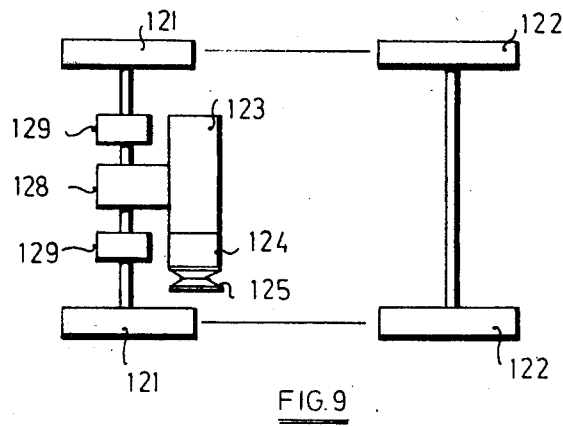
FIGS. 9 and 10 are diagrams illustrating the invention applied to a motor vehicle having a transverse engine.
Figure 10:
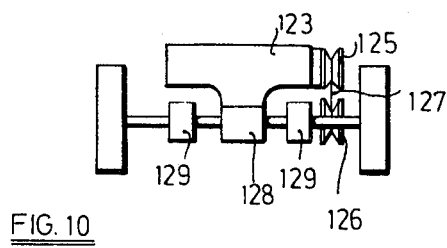

FIGS. 9 and 10 illustrate diagrammatically the application of transmission means embodying the invention to a motor vehicle having a transverse front engine. Referring to these Figures, FIG. 9 is a diagrammatic plan view and the front wheels of the vehicle are indicated at 121 and the rear wheels at 122. The engine is indicated at 123 and as will be seen is arranged transversely of the longitudinal axis of the vechicle and it drives a torque converter 124 which in turn drives the input pulley 125 of a belt drive described in detail above. FIG. 10 is a diagrmmatic front view and shows that the pulley 125 drives an output pulley 126 by means of the chain belt 127. The output pulley drives through change direction gearing which is mounted in the housing 128 which also contains a differential gear as described in relation to FIG. 5. The differential gear drives the front wheels 121 through constant velocity joints 129 again as described in relation to FIG. 5. It will be seen that this arrangement is very compact and fits well into a motor vehicle having a transverse engine.

It will be seen that the invention provides transmission means of the kind specified which overcomes the disadvantages of the previous proposal as set out above.

We claim:

1. A transmission means comprising a hydrokinetic torque converter for drive by a prime mover, said torque converter including a turbine and an output shaft, a continuously variable speed drive connected to said output shaft, and selectively operable change direction gearing driven by said drive and in turn driving a rotary output, said gearing having a neutral state in which the output is disconnected from said drive and said torque converter including clutch means interposed between said torque converter turbine and said output shaft thereof, selectively operable to interupt drive through said torque converter.

2. A transmission means according to claim 1 wherein said drive is a belt drive in which a belt or chain drives between two pulleys rotatable about parallel axes, at least one of said pulleys being of variable pitch whereby the ratio of the drive may be varied steplessly, and one of said parallel axes is coincident with the rotary axis of said torque converter and the path of the drive through said transmission means is U shaped, said torque converter and one said pulley of said belt drive being in one limb of the U and the other said pulley of said belt drive and said change direction gearing being in the other limb of the U.

3. A transmission means according to claim 1 wherein said drive is a belt drive in which a belt or chain drives between two pulleys rotatable about parallel axes, at least one of said pulleys being of variable pitch whereby the ratio of the drive may be varied steplessly, and one of said parallel axes is coincident with the rotary axis of said torque converter and the path of the drive through the transmission means is generally Z-shaped, said torque converter and one said pulley of said belt drive being in one of the parallel limbs of the Z and the other said pulley of said belt drive and said change-direction gearing being in the other limb of the Z.

4. A transmission means according to claim 1 wherein said gearing is a three element, spur-gear epicyclic gearing, a clutch being provided between two elements of the gearing and operable to give drive in one direction and a brake being provided to brake the third element of said gearing to give drive in the opposite direction.

5. A transmission means according to claim 1 wherein said change-direction gearing includes dog-clutch means operable to give said neutral state, and thus a disconnection between the output and the drive, and forward and reverse rotation of the output.

6. A transmission means according to claim 5 wherein said change-direction gearing comprises a first shaft on which are rotatably mounted first and second gears which can be selectively clutched to said first shaft by said dog-clutch means and a second shaft constituting the output and having fixed therein third and fourth gears, said first gear meshing with said third gear and said second gear meshing with an idler gear which in turn meshes with said fourth gear.

7. A transmission means according to claim 6 wherein said first shaft carries an externally splined hub on which is slidable an internally splined sleeve, said sleeve having a first position in which it engages with said hub and external splines on said first gear, a second position in which it engages with said hub and external splines on said second gear and a neutral position in which it engages neither of said first and second gears whereby the output is disconnected from said drive, said hub, said sleeve and said external splines constituting said dog-clutch means.

* * * * *